(12) United States Patent  
de Klerk et al.

(10) Patent No.: US 8,879,886 B2
(45) Date of Patent: Nov. 4, 2014

(54) METHOD AND APPARATUS FOR CONFIGURING STORAGE OF VIDEO DATA FROM A PLURALITY OF SOURCES

(75) Inventors: Adrianus A. de Klerk, Fresno, CA (US); Kirsten Medhurst, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 1221 days.

(21) Appl. No.: 12/234,495

(22) Filed: Sep. 19, 2008

(65) Prior Publication Data

US 2009/0080861 A1  Mar. 26, 2009

Related U.S. Application Data

(60) Provisional application No. 60/994,867, filed on Sep. 21, 2007.

(51) Int. Cl.
   *H04N 5/77* (2006.01)
   *H04N 5/76* (2006.01)
   *G11B 27/10* (2006.01)

(52) U.S. Cl.
   CPC ............... *H04N 5/76* (2013.01); *H04N 5/772* (2013.01); *G11B 27/102* (2013.01); *G11B 2220/40* (2013.01)
   USPC .......................................... 386/223; 386/248

(58) Field of Classification Search
   USPC ................................................. 386/223, 248
   See application file for complete search history.

(56) References Cited

U.S. PATENT DOCUMENTS

| | | | |
|---|---|---|---|
| 5,471,316 A | 11/1995 | Sugawara et al. | |
| 6,133,910 A | 10/2000 | Stinebruner | |
| 6,208,379 B1 * | 3/2001 | Oya et al. | 348/211.11 |
| 6,803,948 B1 * | 10/2004 | Schmale | 348/222.1 |
| 7,110,027 B2 | 9/2006 | Wyman | |
| 2003/0011678 A1 * | 1/2003 | Chun | 348/143 |
| 2003/0059204 A1 * | 3/2003 | Obara | 386/92 |
| 2004/0141718 A1 | 7/2004 | Miyagoshi et al. | |

(Continued)

FOREIGN PATENT DOCUMENTS

| | | |
|---|---|---|
| CN | 1397888 | 2/2003 |
| JP | 2001-86457 | 3/2001 |

(Continued)

OTHER PUBLICATIONS

Chinese Office Action mailed Feb. 21, 2013, in Chinese Application No. 200880108276.4, "Method and Apparatus for Configuring Storage of Video Data From a Plurality of Sources,".

(Continued)

*Primary Examiner* — Michael Simitoski
*Assistant Examiner* — Ali Shayanfar
(74) *Attorney, Agent, or Firm* — Hamilton Brook Smith & Reynolds, PC (57) ABSTRACT

A method of configuring a storage device for recording video data from a plurality of video sources comprising the steps of providing a list of parameters that control settings of the plurality of video sources that affect the amount of video data that will be provided by a video source from the plurality of video sources, allowing a user to select a parameter from the list, allowing the user to change the selected parameter, determining the effect of changing the selected parameter on the amount of video storage available; and providing the user with feedback concerning the effect of changing the selected parameter.

15 Claims, 6 Drawing Sheets

(56) References Cited

U.S. PATENT DOCUMENTS

| | | | |
|---|---|---|---|
| 2005/0091311 A1* | 4/2005 | Lund et al. | 709/203 |
| 2006/0048205 A1 | 3/2006 | Poslinski | |
| 2006/0133476 A1* | 6/2006 | Page et al. | 375/240.01 |
| 2006/0222326 A1 | 10/2006 | Komi et al. | |
| 2007/0024705 A1* | 2/2007 | Richter et al. | 348/142 |
| 2007/0174336 A1* | 7/2007 | Day et al. | 707/104.1 |
| 2007/0201815 A1 | 8/2007 | Griffin | |
| 2008/0086743 A1* | 4/2008 | Cheng et al. | 725/38 |

FOREIGN PATENT DOCUMENTS

| | | |
|---|---|---|
| JP | 2007/243699 | 9/2007 |
| WO | 2005027068 A | 3/2005 |
| WO | WO 2009/039446 | 3/2009 |

OTHER PUBLICATIONS

Notification Concerning Transmittal of International Preliminary Report on Patentability (Chapter 1 of The Patent Cooperation Treaty), mailed Apr. 1, 2010 for PCT/US2008/077123.
Notification of Transmittal of the International Search Report and the Written Opinion of the International Searching Authority, or the Declaration, mailed Dec. 1, 2008 for PCT/US2008/077123.
European Search Report dated Jun. 6, 2010 for PCT/US2008/077123.

* cited by examiner

METHOD AND APPARATUS FOR CONFIGURING STORAGE OF VIDEO DATA FROM A PLURALITY OF SOURCES

CROSS-REFERENCE TO RELATED APPLICATION

This application is related to and claims the benefit of U.S. Provisional Patent Application Ser. No. 60/994,867 filed Sep. 21, 2007, entitled METHOD AND APPARATUS FOR DVR STORAGE OPTIMIZATION, the entirety of which is incorporated herein by reference.

STATEMENT REGARDING FEDERALLY SPONSORED RESEARCH OR DEVELOPMENT

N/A

BACKGROUND OF THE INVENTION

This invention relates to surveillance systems and, in particular, to a method and apparatus for configuring the storage of video data in a video surveillance system.

Storing the video data gathered by video surveillance systems has been a challenge because of the large amount of data involved. There are numerous parameters that affect the amount of storage needed to digitally record the video image data from a camera or other video source. For example, some of the parameters associated with a camera that affect storage requirements are frames per second, image size, image quality, recording schedule, and transition point in time from a short term recording rate to a long term recording rate. If a plurality of cameras are to be recorded, the number of adjustable parameters increases dramatically thereby making it difficult for a user to manage the multiple settings while attaining the desired amount of storage time. System configuration at best is inefficient and at worst may result in the user settling for a configuration that is not optimized because the user cannot effectively deal with all the choices that must be made. For example, if the system had sixteen cameras and there were five changeable parameters as described above, then the user would have to enter eighty parameters and hope that the total system storage time was as needed. If the storage time is not as needed, then the problem becomes knowing which one or ones of the 80 parameters needs to be adjusted and how much. In addition, storage time is more sensitive to some parameters than to others. This is an essentially impossible task for the user. Moreover, not using all of the available storage can increase storage costs, and the quality of the video data recorded may be less than the highest possible quality. Accordingly, there has been a need in the industry for an efficient and effective method of configuring a digital recording device, such as a digital video recorder, to store video data from a plurality of sources.

SUMMARY OF THE INVENTION

In accordance with the present invention there is provided a method of configuring a storage device for recording video data from a plurality of video sources. The method comprises the steps of providing a list of parameters that control settings of the plurality of video sources that affect the amount of video data that will be provided by a video source from the plurality of video sources, allowing a user to select a parameter from the list, allowing the user to change the selected parameter, determining the effect of changing the selected parameter on the amount of video storage available; and providing the user with feedback concerning the effect of changing the selected parameter.

In another aspect of the present invention there is provided an apparatus for configuring storage for recording video data from a plurality of video sources. The apparatus comprises a processor, an input adapted to receive video data from a plurality of video sources, and memory. The processor is adapted generate a signal to provide a list of parameters that control settings of the plurality of video sources connected to said input that affect the amount of video data that will be provided by a video source from the plurality of video sources, allowing a user to select a parameter from the list, allowing the user to change the selected parameter, determining the effect of changing the selected parameter on the amount of storage available in said memory and providing the user with feedback concerning the effect of changing the selected parameter.

In a further aspect of the present invention there is provided a computer readable medium containing instructions that, when executed by a computer, cause the computer to perform the method described hereinabove.

The present invention provides a method that allows a user installing a digital video recorder or other storage device to adjust storage-related settings to maximize the days of storage while achieving the highest possible quality (resolution and frame rate) for stored video. A user can specify storage settings depending upon what is important to him. For some users, maximizing the days of storage is most important, while for others retaining video at a high frame rate and resolution are of greater priority. Depending upon a user's specific requirements, he can choose the setting of interest, click the lock button on the display, and the other settings will be updated automatically. The user can also adjust the stored frame rate and resolution for individual cameras to increase the stored quality for high-priority cameras or to decrease the quality for lower-priority cameras. The present invention provides the user with the ability to fine-tune the key variables affecting video retention time and provides visual feedback on the effect of changes to those variables. The present invention saves on storage costs, while retaining the high-priority video at the highest possible quality for the required amount of time, and provides an efficient and effective method of configuring the storage of video data from a plurality of sources.

Other advantages and applications of the present invention will be made apparent by the following detailed description of the preferred embodiment of the invention.

DETAILED DESCRIPTION OF THE INVENTION

Figure 1:
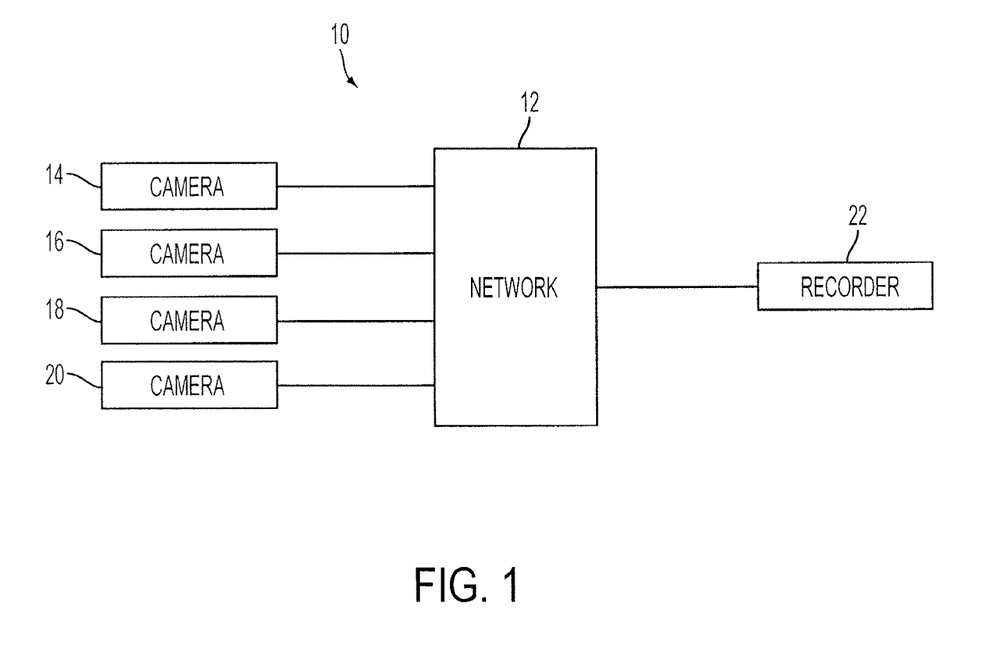
FIG. 1 is a block diagram of a video surveillance system utilizing the present invention.

Referring to FIG. 1, a video surveillance system 10 has a network 12 which can be a closed network, local area network, or wide area network, such as the Internet. A plurality of cameras 14, 16, 18, and 20, or other video sources, such as, digital video recorders or servers, are connected to network 12 to provide real-time video streams, such as MPEG video streams. Recorder 22, which can be, for example, a digital video recorder (DVR), personal computer or other digital storage device, is connected to network 12. Cameras 14, 16, 18, and 20 provide MPEG video streams to workstation 22 via network 12. Although video surveillance system 10 has been show as including a network 12, cameras 14, 16, 18, and 20 could be directly connected to recorder 22.

Figure 2:
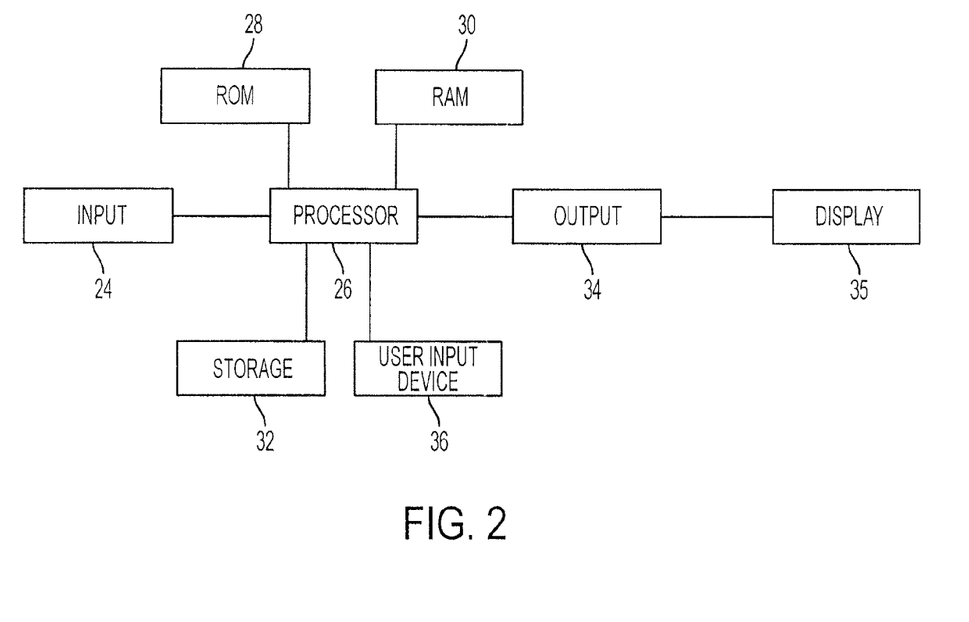
FIG. 2 is a block diagram of an exemplary recorder in the video surveillance system shown in FIG. 1.

FIG. 2 illustrates one embodiment of recorder 22 for implementing the present invention. Input 24 receives the video data streams from the cameras and other video sources and provides them to processor 26. Processor 26 is connected to ROM 28, RAM 30, and storage 32, which can be, for example, a disk drive or optical drive. Processor 26 provides output signals to output 34 for display on display 35. Processor 26 implements algorithms and programs, including the method of the present invention, that are stored in ROM 28 or storage 32. User input device 36 can be a controller, keyboard, or other suitable input device connected directly to recorder 22, or user input device 36 can be connected via network 12. User input device 36 provides user input to processor 26, as described herein for configuring the storage of the video data from a plurality of cameras or other video sources in recorder 22.

The present invention utilizes all of the relevant parameter associated with a camera that affect storage requirements, such as frames per second, image size, image quality, recording schedule, and transition point in time from a short term recording rate to a long term recording rate, and calculates the storage consumed by each camera. This allows unique settings optimized for each camera, and then sums the results to give an overall storage time. Thus, a user can specify a given storage time and change a single group of values and observe the effect on the other unlocked parameters.

A matrix or table or similar list of the selected parameters for each camera is created. Those parameters that are "must have" requirements can be locked by some notation in the table so that they will remain fixed while the user adjusts other parameters that are less critical to him. Alternately, the system can lock in the needed overall storage time and automatically adjust any unlocked parameters to achieve the desired overall storage time result. The user can fully define and lock all of the cameras except one and let the computer set the other camera channel. If the result is not achievable, then the system will show an error. Then, one or more of the previously fixed camera channels must be adjusted until the last camera has a feasible or workable result.

The algorithm is driven by the entries in the table and takes all the known and locked values and chooses the unlocked or selectable variables. A flow chart explaining the algorithm that does the storage time estimation from the locked table values and the variable parameters is shown below. It should be clear that if the storage time is locked, the same algorithm could propose specific camera parameters or groups of global parameters. A smaller table with fewer variables per camera could be used by providing fixed parameters directly to the algorithm, but not making them visible in the table.

Figure 3:
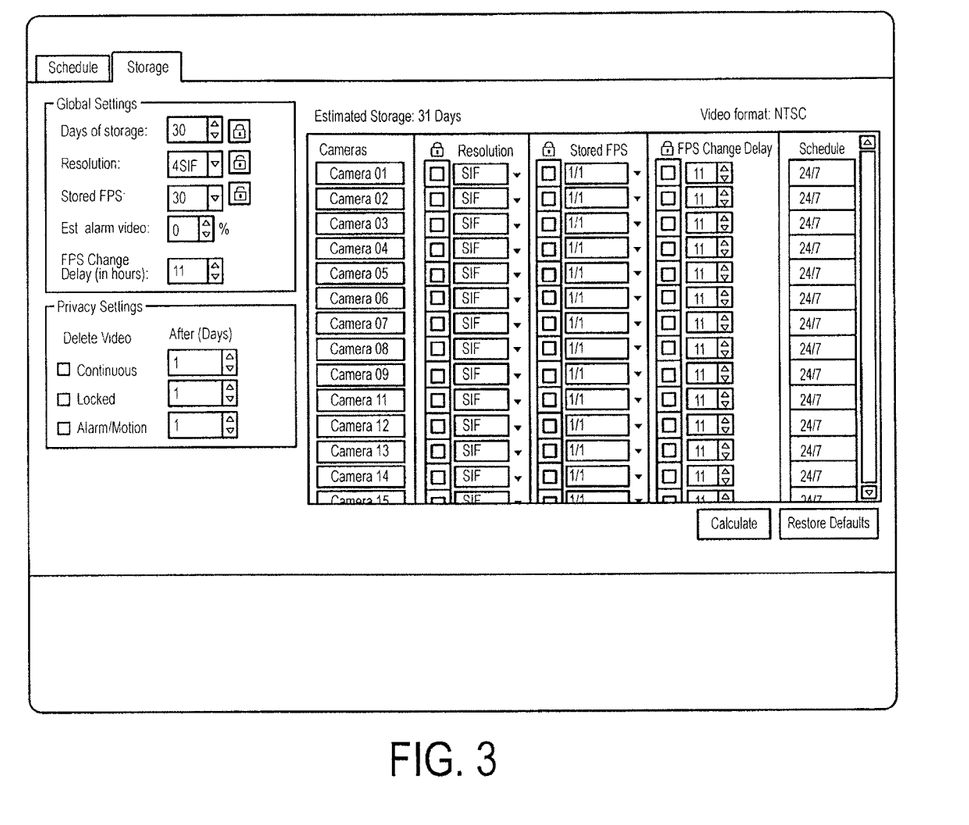
FIG. 3 is an illustration of one embodiment of a display screen for implementing the present invention.

A sample display screen for implementing the present invention that could be displayed on display 35 is illustrated in FIG. 3. In the upper left corner of the screen are the global storage settings. These can be used to specify the desired days of storage, the resolution, stored frame rate, and the FPS change delay for all the cameras. The purpose of the FPS change delay is to specify how long full motion video (30 frames per second) should be retained. By default this value is set to 11 hours. Locked video is always retained at its full frame rate until the privacy setting limit for locked video is reached.

The Privacy Settings located below the Global Settings allow a user to specify when the video recordings must be deleted to comply with the privacy directives in some countries which require that video recording systems delete video after a certain number of days have passed. A user may delete all of the recording types (continuous, motion, and alarm) after the same number of days, or, if operating in a country where privacy settings are not mandated, a user may choose to delete continuous video only, while retaining any alarm or motion video. The deletion preferences are activated by using a mouse and clicking the checkbox beside the recording type to delete and adjusting the spinner box to reflect the maximum number of days to retain the video. If one of the global settings is changed and that change is to apply to all of the cameras, the lock icon is clicked with a mouse. Clicking the lock causes the settings for the cameras to be updated and fixed to this global setting.

Above the cameras list appears the "Estimated storage" in days. This number updates every time a user clicks the Calculate button with a mouse, reflecting any changes made to the global settings, camera settings, or privacy settings. The Estimated Storage box turns bright red if changes to one or more settings will prevent the system from meeting the minimum "Days of storage" requirement specified in Global Settings.

On the right side of the screen shown in FIG. 3 is the camera settings grid. For each camera, a user can adjust the resolution and stored frame rate and see whether that camera is set to record 24/7 or on a schedule. A user can also change the frame rate change delay for each camera.

For a high-priority camera, a user may want to increase the resolution and frame rate to values higher than the global settings. Alternatively, to save space, a user may want to reduce the resolution and stored frame rate for low-priority cameras. After making a camera-specific adjustment, a user then clicks the checkbox with a mouse to lock that value in place. This will prevent that camera's configuration from being reset the next time a global setting change is made. The Calculate button is then clicked with a mouse to see how the changes made to a camera affect the other camera settings and the estimated days of storage.

The Estimated Alarm Video setting in the Global Settings helps improve the estimate for the days of storage. Because alarm-related video is retained for longer periods than other types of recording, including an estimate of the percentage of recordings expected to be triggered by alarms will make sure space is allowed for this extra retention time and will therefore make the estimates more realistic. By default, the percentage is set to 0; increasing this estimate will reduce the estimated days of storage.

In FIG. 3, a user has locked the global setting for days of storage to 30. All of the camera settings on the right updated to accommodate this requirement, dropping the resolution from 4 SIF to SIF and the stored FPS from 30 to 1. The Estimated Storage calculation above the cameras grid updates to show that with these settings, the DVR should be able to store 31 days of video data.

Figure 4:
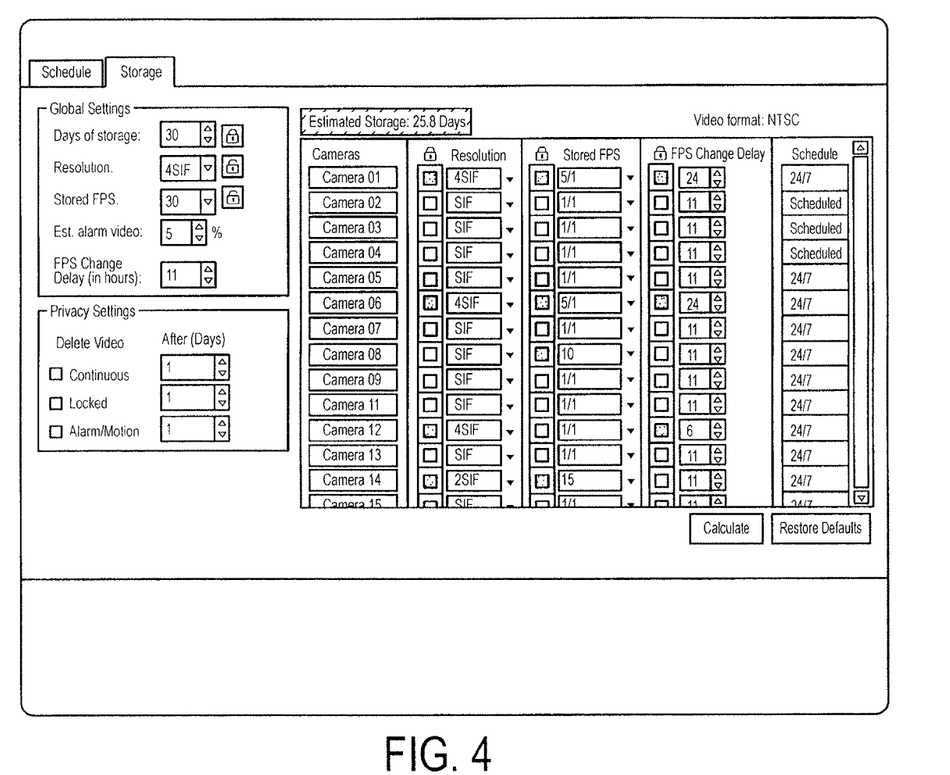
FIG. 4 is an illustration of one embodiment of a display screen for implementing the present invention.

In FIG. 4, which illustrates a sample display screen for implementing the present invention that could be displayed on display 35, a user has adjusted the settings for individual cameras. Cameras 1 and 6 might be high priority cameras, where the user wants to have the highest possible resolution and a stored frame rate greater than 1 fps and where he wants to keep full motion video for 24 hours. For Camera 8, the user cares about stored frame rate, but not the other two parameters. For Camera 12, the user has locked in the resolution and FPS change delay, while for Camera 14 the lock is placed on resolution and stored FPS. All unlocked cameras are set to the lowest possible values, in an attempt to achieve the desired days of storage. Because of these changes to the camera settings, the estimated days has been reduced to 23.6 days of storage and is now less than the requested days of storage. This shortfall is highlighted by a change to the background color for the estimated storage display as indicated by the diagonal shading.

Figure 5:
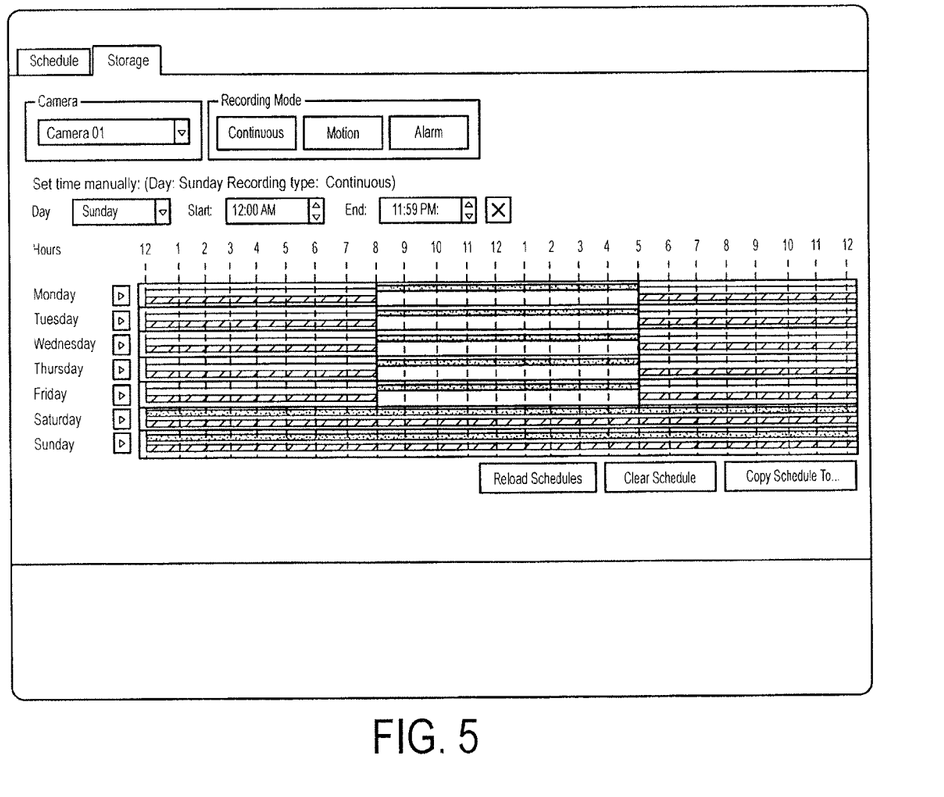
FIG. 5 is an illustration of one embodiment of a display screen for implementing the present invention.

The recording schedule is one variable that significantly affects the estimated days of storage but cannot be adjusted on the screen shown in FIG. 3. For example, by default each camera can be scheduled to record continuously 24 hours a day, 7 days a week. Any changes to this schedule will affect the calculated storage, for example, decreasing the number of hours recorded will increase the number of days of storage. FIG. 5 illustrates one embodiment of a scheduling screen that can be utilized in the present invention. In the camera settings grid, the Schedules column indicates whether a camera is set to record 24/7 or on a schedule. Moving a mouse pointer to the Schedules tab and clicking the mouse button enables a user to adjust a recording schedule.

It should be understood that a computer, as used herein, can have a single processor or multiple processors, which can operate in parallel and/or not in parallel. A computer also refers to two or more computers connected together via a network for transmitting or receiving information between the computers and includes a distributed computer system for processing information via computers linked by a network. A digital video recorder or other recording device containing a processor is a computer as used herein.

Figure 6:
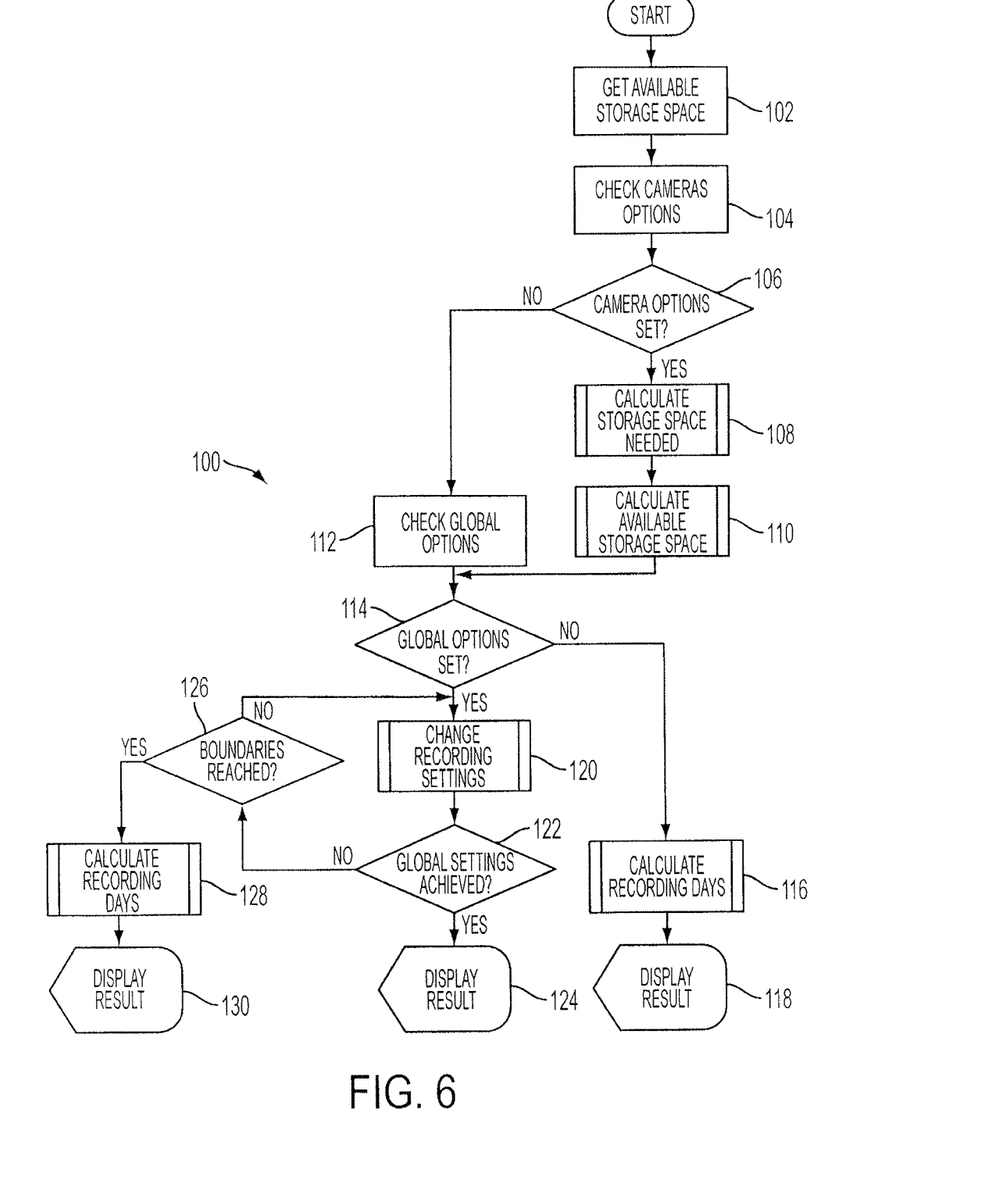
FIG. 6 is a flowchart illustrating one embodiment of the process of the present invention.

FIG. 6 is a flowchart illustrating one embodiment of the process of the present invention. At step 102 of process 100, processor 26 gets the available storage space in storage 32. Processor 26 then checks the camera options at step 104. At 106, processor 26 then determines if the camera options have been set. If the camera options have been set the process proceeds to step 108 where processor 26 calculates the storage space needed based on the settings. At step 110, the available storage space is calculated. If the camera options have not be set then at 106 the process proceeds to step 112 to check global options. From steps 110 or 112, the process proceeds to 114 where processor 26 determines if the global options have been set. If the global options have not been set, then at block 116 processor 26 calculates the number of recording days and displays the result at step 118.

If at step 114 processor 26 determines that the global options have been set, then the process proceeds to step 120 to change the recording settings. At step 122, processor 26 determines if the global settings have been achieved. If the global settings have been achieved, then the results are displayed at block 124. If the global settings have not been achieved, then the process proceeds to step 126 where processor 26 determines if boundaries have been reached. If the answer is not, then the process returns to step 120. If boundaries have been reached, then at step 128 processor 26 calculates the number of recording days, and the results are displayed at block 130.

The configuration program can be stored on a computer readable medium, which refers to any storage device used for storing data accessible by a computer. Examples of a computer readable medium include a magnetic hard disk, a floppy disk, an optical disk, such as a CD-ROM or a DVD, a magnetic tape, a memory chip, and a carrier wave used to carry computer readable electronic data, such as those used in transmitting and receiving e-mail or in accessing a network.

An alternate embodiment of the present invention would be to establish the storage resources or percentage of the total available memory to be allocated to a single camera or block of cameras, and use the above-described process to optimize that camera or group of cameras. Continuing through all available groups in the same manner allows the overall system to be configured with a total storage time defined. Although the method of the present invention has been described as allowing all parameters to be adjustable individually, a particular variable can be made global so that one change is automatically entered in the correct spot for the given group.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A computer implemented method of configuring a storage device having a storage capacity for recording video data from a plurality of video sources, the method comprising:
providing, to a user, a list of camera parameters that control settings of the plurality of video sources, the settings affecting an amount of video data provided by at least one of the plurality of video sources;
allowing the user to select a camera parameter from the list;
allowing the user to change the selected camera parameter;
determining an effect of changing the selected camera parameter on the amount of video data expected to be provided by the plurality of video sources;
providing the user with feedback concerning the effect of changing the selected camera parameter;
enabling the user to change a global camera parameter that affects the settings of all of the plurality of video sources;
enabling the user to lock a local camera parameter related to a particular video source from the plurality of video sources so that the local camera parameter pertaining to the particular video source is not changed when a user changes the global camera parameter that affects the settings of all of the plurality of video sources; and
adjusting at least one unlocked camera parameter based on the local camera parameter having been locked, the global camera parameter, and the storage capacity provided by the storage device.

2. A method as recited in claim 1 wherein determining the effect of changing the selected camera parameter on the amount of video data expected to be provided by the plurality of video sources comprises determining an amount of time that video data can be recorded before the storage device is full.

3. A method as recited in claim 2 wherein providing the user with feedback concerning the effect of changing the selected camera parameter comprises providing the user with feedback concerning the amount of time that video data can be recorded before the storage device is full.

4. A method as recited in claim 1 wherein providing a list of camera parameters comprises providing at least one of the following camera parameters: frames per second, image size, image quality, and recording schedule.

5. An apparatus for configuring storage having a storage capacity for recording video data from a plurality of video sources, the apparatus comprising:
   a processor;
   an input adapted to receive video data from a plurality of video sources; and
   memory, said processor being adapted to:
      generate a signal to provide, to a user, a list of camera parameters that control settings of the plurality of video sources connected to said input, the settings affecting an amount of video data provided by at least one of the plurality of video sources,
      allow a user to select a camera parameter from the list,
      allow the user to change the selected camera parameter,
      determine an effect of changing the selected camera parameter on the amount of data expected to be provided by the plurality of video sources to be stored in said memory,
      provide the user with feedback concerning the effect of changing the selected camera parameter,
      enable the user to change a global camera parameter that affects the settings of all of the plurality of video sources,
      enable the user to lock a local camera parameter related to a particular video source from the plurality of video sources so that the parameter pertaining to the particular video source is not changed when the user changes the global parameter that affects the settings of all of the plurality of video sources; and
      adjusting at least one unlocked camera parameter based on the local camera parameter having been locked, the global camera parameter, and the storage capacity provided by the storage.

6. An apparatus as recited in claim 5 wherein said processor is further adapted to determine an amount of time that video data can be recorded before said memory is full.

7. An apparatus as recited in claim 6 wherein said processor is further adapted to provide the user with feedback concerning the amount of time that video data can be recorded before said memory is full.

8. An apparatus as recited in claim 5 wherein said processor is adapted to provide at least one of the following camera parameters: frames per second, image size, image quality, and recording schedule.

9. A non-transitory computer readable medium containing instructions that, when executed by a computer, cause the computer to perform the method of claim 1.

10. A computer readable medium as recited in claim 9 wherein determining the effect of changing the selected parameter on the amount of video storage available comprises determining an amount of time that video data can be recorded before the storage device is full.

11. A computer readable medium as recited in claim 10 wherein providing the user with feedback concerning the effect of changing the selected camera parameter comprises providing the user with feedback concerning the amount of time that video data can be recorded before the storage device is full.

12. A computer readable medium as recited in claim 9 wherein providing a list of parameters that control settings of the plurality of video sources that affect the amount of video data provided by the video source from the plurality of video sources comprises providing at least one of the following camera parameters: frames per second, image size, image quality, and recording schedule.

13. A system for managing the storage of video data having a storage capacity from a plurality of video sources comprising:
   a plurality of video cameras for acquiring video data;
   a recording unit in communications with the plurality of video cameras, the unit configured to
      (i) receive video data from the plurality of video cameras,
      (ii) generate a signal to a display to provide a user with a list of camera parameters that control settings of the plurality of video sources, the settings affecting an amount of video data provided by a video source from the plurality of video sources,
      (iii) allow the user to select at least one of the camera parameters from the list,
      (iv) allow the user to change the selected camera parameter,
      (v) determine the effect of changing the selected camera parameter on the amount of video data expected to be provided by the plurality of video sources,
      (vi) provide the user with feedback concerning the effect of changing the selected camera parameter,
      (vii) enable a user to change a global camera parameter that affects the settings of all of the plurality of video sources,
      (vii) enable the user to lock a local camera parameter related to a particular video source from the plurality of video sources so that the parameter pertaining to the particular video source is not changed when the user changes the global parameter that affects the settings of all of the plurality of video sources, and;
      (vii) adjusting at least one unlocked camera parameter based on the local camera parameter having been locked, the global camera parameter, and the storage capacity provided by the storage.

14. The system as recited in claim 13 wherein the recording unit processor is further configured to determine an amount of time that video data can be recorded before said memory is full.

15. The system as recited in claim 14 wherein the recording unit processor is further configured to provide the user with feedback concerning the amount of time that video data can be recorded before said memory is full.

\* \* \* \* \*